United States Patent Office 3,500,854
Patented Mar. 17, 1970

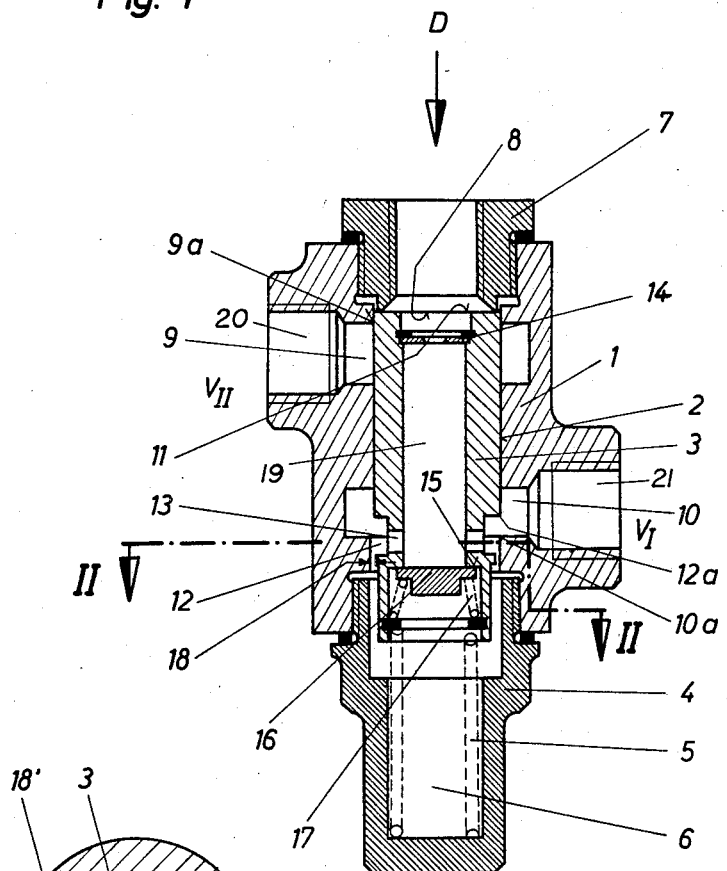
Fig. 1
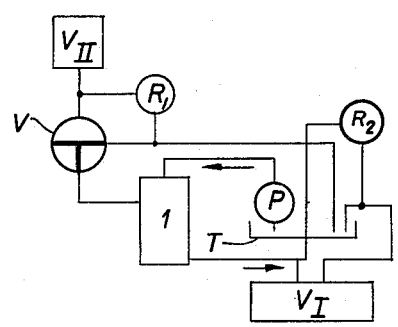
Fig. 2
Fig. 3

3,500,854
VALVE DEVICE
Johannes Altmeppen, Empelde, and Albert Steidl, Schwabisch, Gmund, Germany, assignors to Zahnradfabrik Friedrichshafen Aktiengesellschaft, a corporation of Germany
Filed Mar. 27, 1967, Ser. No. 626,076
Claims priority, application Germany, Mar. 25, 1966, Z 12,126
Int. Cl. G05d 11/03
U.S. Cl. 137—118                    7 Claims

ABSTRACT OF THE DISCLOSURE

The invention is for an automatically acting distribution valve which provides flow to two systems which use hydraulic feed wherein continuous flow to one system must be maintained at a substantially constant pressure value and during the course of which flow the other system may be intermittently fed and exhausted, without causing any serious disturbance of pressure in the continuous flow system. The effect is accomplished by means of a sliding sleeve valve having an initial position biased to cut off flow to the intermittent system while permitting flow continuously to the other system. The valve is actuated in a manner heretofore known by a differential pressure diaphragm having a restricted flow orifice at one end of an axial passageway in the valve sleeve. The other end of the passageway is closed by a check valve so that when the valve sleeve is moving to open flow to the intermittent system, movement is retarded by the piston displacement effect in coaction with a restricted flow circumferential gap between the valve sleeve and housing which throttles flow to slow the opening movement, thus avoiding vibrations of the valve sleeve.

When pressure feed to the intermittently operating system is cut off there is ordinarily a pressure drop in the housing due to momentary connection with the exhaust line of the pressurizing system, aggravated by a slowly closing sleeve valve due to suction effect.

To eliminate this harmful effect the check valve opens when the sleeve valve moves to cut off the intermittently operable system. This permits large flow through the valve sleeve eliminating the suction that would otherwise slow the movement. The opening of the check valve thus permits rapid movement of the sleeve valve to closing position so that there is no large drop in pressure in the housing which would affect the continuously operating system.

Field of the invention

The invention is primarily in the field of industrial vehicles wherein one pressure system, requiring a continuous and constant pressure flow is utilized for power boost steering and the other system is for intermittent usage for operating the power cylinder of a hoist or other accessory.

Description of the prior art

Prior art devices have heretofore been known for distribution and regulation of pressure from a single source to a pair of systems. However, such prior art valve devices have had a serious drawback in that, when the intermittently fed system is cut off, the valve action is sluggish due to suction effect in the housing which resists valve movement. This causes pressure drop to occur in the continuously fed system. With such valve devices, if an operator is steering the vehicle so that the force of his hands on the steering wheel is balanced by the pressure of the system in which the sudden pressure drop occurs, injury to his hands is likely to result. Typical prior art valve devices are shown in the U.S. Patent to Chinn 2,500,627 (1950) and in British Patent 589,095 (1947).

Summary of the invention

The invention comprises a valve housing having an axial inlet port for pressure fluid from a pump, a radial outlet port to continuously supply pressure fluid to a booster steering system, and another radial outlet port to intermittently supply pressure fluid to an accessory apparatus, such as a hoist. A sleeve valve is reciprocal in the housing and is biased normally to cut off the port for the accessory but has a groove and bores coacting with the housing to permit continuous flow to the booster steering system. The sleeve valve is open centrally throughout its length and the end adjacent the inlet port has a flow restriction member across which a differential pressure occurs when pressure is built up at the inlet port, a matter under control of a vehicle operator who speeds up the engine to achieve the effect. Such differential pressure is sufficient to shift the valve against the closing bias to open communication to the accessory feed port. The sleeve valve and housing are fashioned to provide a flow restriction therebetween for fluid which must pass internally through the sleeve valve and thence externally through bores therein into a housing chamber. Such retriction acts as a retarder of flow in order to slow up the opening motion of the sleeve valve to prevent vibrations of the valve sleeve. Thus, relatively gradual opening is effected in the passage from the feed pressure input to the accessory port. However, when pressure flow to the accessory power cylinder is cut off and the feed line thereto is exhausted by an operator controlled valve, a sudden drop in pressure occurs throughout the housing and the sleeve valve which would cause a drop in pressure in the steering control system with possible harmful effects. This is counteracted by permitting extremely fast movement of the sleeve valve by providing a check valve held closed by a relatively light spring which is carried by the sleeve valve and which is forced open immediately upon the reversing direction of the sleeve valve. By this action communication to exhaust from the accessory port is very quickly closed and pressure substantially maintained in the housing. Accordingly, due to the rapidity of the action, there is no sudden pressure drop in the steering booster system which would othewise occur if the sleeve valve were to close slowly as it does in the prior art devices.

The housing is provided with a chamber in which a portion of the sleeve valve reciprocates and which chamber is filled with the hydraulic fluid and communicates with the interior of the sleeve valve so that upon opening of the check valve, which is at the end of the sleeve valve adjacent the chamber, suction effect on the sleeve valve is broken and the sleeve valve can quickly move to avoid drop of pressure in the steering booster system.

Brief description of drawing

FIGURE 1 shows a vertical cross section through a valve device of the invention;
FIGURE 2 is a section through II—II of FIG. 1 showing a modified throttling arrangement for retarding opening motion of the valve; and
FIGURE 3 is a symbolic diagram of a system in which the invention is used.

Description of the invention

Referring to FIGURE 1, the invention comprises a housing 1 having at its upper end a port bushing 7 which forms an inlet port for hydraulic fluid under pressure, as indicated by the directional arrow D. The bushing is, of course, suitably and sealably secured in the housing and the lower end of the bushing effects a valve seat 11 which coacts with the radial face 8 of a valve sleeve 3 slidably disposed in a bore 2 of the housing and having a central passage 19. A lateral port 20 connecting with an annular channel 9 in the housing is provided for the purpose of communicating pressure fluid to an intermittently operable load, as indicated by $V_{II}$. Annular channel 10 receives pressure fluid passing axially downward through the central passage of the valve sleeve, via radial bores 13, recess 12, to feed via the adjacent port, a booster steering mechanism of conventional type via port 21, as indicated by $V_I$.

It will be understood that the accessory is powered by a single acting cylinder and that the booster steering system is powered by a double acting cylinder. However, only incoming fluid passes through the valve, and there is no reversal of direction through the device of fluid for exhaust.

The lower end of the valve sleeve is biased by a spring 5 so as to maintain a closed condition at the contiguous surface indicated by 9a acting in conjunction with the closed condition of the valve seat 11. Continuous flow, although in small quantity when the vehicle engine is idling, is thus provided under throttling control of the annular shoulder 12a on the valve sleeve which coacts with the fixed annular shoulder 10a of the housing to effect an ever present but variable opening for access and throttling control of fluid to the port 10.

The lower end of the housing is closed by an end cap 6 which houses a bias spring 5 and which forms a chamber which is filled with hydraulic fluid, as will be apparent from consideration of FIGURE 1. Thus, as the valve sleeve reciprocates, it moves downwardly toward chamber 6 in opening up pressure flow to port 9 at closure areas 9a and 11. In so doing, the downward movement is retarded to a predetermined extent by a restricted flow gap indicated at 18. This gap is effected by a ridge formation as shown at the lower end of the valve sleeve. The retarding effect is caused by the need for displacement of fluid from chamber 6 as the valve sleeve moves downwardly, it being noted that the bottom of the axial passage is, at this time, closed by a check valve 16 biased by a valve spring 17 against the seat 15 opening at the bottom of the passage of the sleeve valve body. The check valve and spring are carried by the valve sleeve and it will be noted that a ring is suitably secured within the hollow of the valve skirt at the lower end of the valve to form an abutment for the springs 5 and 17.

Accordingly, as the valve sleeve moves downwardly, its progress is slowed by the throttling effect of the restricted passage 18 as fluid displaced therepast from chamber 6. This effect acts as a vibration damper. A shock absorber effect is likewise advantageous for the movement of the velve in its opening motion since a very heavy pressure may be suddenly introduced for valve actuation.

The mode of actuation of the valve sleeve 3 has heretofore been known and comprises a disc 14 with a flow restricting port therethrough, carried at the upper end of the valve sleeve. Thus, assuming that the device is used in a vehicle, there is an engine driven pump continuously pumping fluid into the inlet port bushing 7 and this would maintain a normal circulation of fluid via channel 10 to the steering mechanism $V_I$. A differential pressure exists above and below disc 14, which differential is raised considerably when the operator accelerates the engine. Accordingly, the build-up of pressure on the top of disc 14 pushes the valve sleeve downwardly against the bias of spring 5 opening up flow to hoist system $V_{II}$ and this motion has a throttling effect of fluid flow between the shoulders 10a and 12a in order to compensate for an assumedly higher pressure of the fluid flow to $V_{II}$ than to $V_I$. The degree of throttling effect is, of course, a matter of design and spring strength departing on a particular application, but, in any event, for all practical purposes, maintains a substantially constant flow of pressure fluid to the steering booster mechanism.

It should be particularly noted that check valve 16 is maintained against its seat 15 when the valve sleeve moves downwardly. However, assuming that the hoist action is to be discontinued, the feed line to the hoist cylinder is momentarily closed up and the port 20 connected to the reservoir T via a rotary three-way valve V (FIG. 3). At this time in prior art devices a serious pressure drop occurs in the booster steering system, due to a very sluggish action of upward movement for valve sleeve 3 under impetus of spring 5 caused by the suction effect produced by a closed end valve sleeve in moving upwardly with respect to the chamber 6 since fluid must be displaced into the chamber via gap 18. In other words, a drop in pressure occurs in the housing 1 which is not immediately alleviated because valve sleeve 3 cannot close fast enough to effect isolating the inlet pressure drop at 9, 19 from propagating into the power steering system $V_I$ for an appreciable period of time before closure at areas 9a and 11. If an operator's hands were on the steering wheel at this time and effecting steering, a considerable shock would result to his hands since suddenly they encounter greatly increased resistance; the force he is exerting had been up to the time of loss of pressure balanced by the pressure in the steering booster cylinder.

However, in the present invention just as soon as pressure is relieved in the bushing 7 and the differential pressure on disc 14 drops, the sleeve 3 starts to move up due to spring 5 and the check valve 16 instantly opens being held only by light bias of spring 17. This permits spring 5 to immediately move sleeve 3 upwards and restrict the gap 9a. This action takes place in a small fraction of a second, in fact, so quickly that there is no harmful pressure drop in the steering booster cylinder. The action, of course, results from the elimination of suction effect on sleeve 3 by virtue of opening of the axial passage when check valve 16 opens, thus permitting a full and rapid fluid flow to maintain chamber 6 fluid-filled as the valve sleeve moves outwardly therefrom. The suction effect that would normally be experienced is eliminated for all practical purposes by virtue of the opening of check valve 16 due to back pressure acting downwardly on it as well as suction effect on its lower area.

The invention makes it relatively easy to design a valve device for any particular installation as compared with prior art devices, because there is no need to experiment for a dimension for the gap 18 which must give not only the required vibration damping effect when the valve sleeve opens but must also provide for a suitably rapid closure to avoid sustained pressure drops in a constant flow pressure system.

FIGURE 2 illustrates another method of producing the retarded flow throttling effect of gap 18 where instead of an annular ridge, restricted passage-ways are formed by flats 18' cut into the sides of the valve.

Referring to FIGURE 3 a conventional system using the invention is illustrated. Thus, the valve device 1 is fed by pump P having the reservoir tank T. A feed line goes to the booster steering system $V_I$ which exhausts to the tank. A second feed line goes to a rotary three-way valve V connecting to a single acting cylinder for the hoist system $V_{II}$. A by-pass relief valve $R_1$ connects the hoist feed line to the tank T. Another relief valve $R_2$ connects the feed line of system $V_I$ to the tank T. In the position shown for the valve V, the hoist is maintained in raised position. It will be understood that valve sleeve 3 is in uppermost position or, in any event, has not been opened to an extent that there is any flow past the closure sleeve area 9a, but may be open at face area 11 as determined by the differential pressure to provide regulated pressure continuous flow to the booster steering mechanism.

If the valve V is rotated 180° out of the position as illustrated in FIGURE 3, the hoist exhausts since the inlet feed thereof is connected through the three-way valve V to the reservoir. To power the hoist the three-way valve is merely rotated counter-clockwise 90° out of the exhaust position and, as explained above, the vehicle engine is speeded up to provide sufficient pressure to fully open the sleeve valve 3 so that flow can occur to $V_{II}$ via the valving areas 9a and 11.

If the hoist $V_{II}$ has reached its desired lifting position the valve V is rotated counter-clockwise 90° back into its position as illustrated, and momentarily there would occur a large pressure drop in the valve 1 and a shock in the steering booster system $V_I$, since the feed line from valve 1 to the three-way valve V is opened to the reservoir. It is the pressure drop effect of this condition that the invention eliminates by the rapid closure of the sleeve valve, as heretofore explained.

We claim:

1. A valve device for distribution and regulation of pressure flow from a pump to a pair of pressure operated systems wherein one system requires a continuous flow of pressure fluid and the other system is intermittently connected for feed and exhaust while said one system is in operation; comprising a housing having a feed inlet and having respective outlets for said systems, a valve member movable in said housing and having a passage for continuous flow to said continuous flow system outlet, a check valve carried by said valve member, actuating means for said valve member to effect movement thereof to open and close flow to said intermittent system outlet, said actuating means being adapted to provide a differential pressure in response to a predetermined inlet feed pressure, said housing and valve member having coacting means for opening and closing said latter flow, said check valve being disposed to open when said valve member is moving in a direction to close flow to said intermittent system outlet so as to permit rapid movement of said valve member.

2. A valve device as set forth in claim 1 further including, movement retarding means in said housing for retarding the movement of said valve member to effect vibration damping when said valve member is actuated to open flow to said intermittent system.

3. A valve device as set forth in claim 1 further including, biasing means for biasing said valve member to closed position, said housing having a closed chamber and said biasing means being disposed therein and said chamber communicating with said passage in said valve member when said check valve is open.

4. A valve device as set forth in claim 1 further including, movement retarding means in said housing for retarding the movement of said valve member to effect vibration damping when said valve member is actuated to open flow to said intermittent system, said retarding means comprising a restricted flow gap intermediate said valve member and said housing to effect throttled flow therebetween of fluid in said housing when said valve member is moving to open flow to said intermittently operable system.

5. A valve device as set forth in claim 1 further including, movement retarding means in said housing for retarding the movement of said valve member to effect vibration damping when said valve member is actuated to open flow to said intermittent system, said retarding means comprising a restricted flow gap intermediate said valve member and said housing to effect throttled flow therebetween of fluid in said housing when said valve member is moving to open flow to said intermittently operable system, a differential pressure actuating means at one end of said passage carried by said valve member and said check valve being carried by said valve member at another end of said passage.

6. A pressure flow distributing valve for opening or cutting off flow to an intermittently operable system while permitting continuous flow to another system and comprising an elongated housing with lateral ports for communicating said housing with respective systems and an axial inflow port for pressure fluid to be distributed by said valve to said systems, a slidable valve sleeve in said housing having an open axial passage and a restricted port means carried by said valve sleeve at one end of said passage adjacent said inflow port whereby a differential pressure is effected to move said valve sleeve when a predetermined inflow pressure is provided, said valve sleeve and said housing having coacting means to open or close flow to said port for said intermittently operable system, a spring for maintaining said valve sleeve at an initial position whereat flow to said intermittently operable system is cut off, a check valve at the other end of the passage openable in response to closing movement of said valve sleeve, whereby in the course of closing movement a relatively large flow can occur through said valve sleeve to facilitate rapid movement thereof.

7. A pressure flow distributing valve as set forth in claim 6 further including, a flow restriction gap intermediate said valve sleeve and said housing to retard flow therebetween of fluid in said housing when said valve sleeve is moving to open flow to said intermittently operable system for effecting a relatively slowed opening of flow to said intermittently operable system for diminishing shock effects in said latter system.

References Cited

UNITED STATES PATENTS

| | | | |
|---|---|---|---|
| 2,737,196 | 3/1956 | Eames | 137—118 X |
| 3,125,110 | 3/1964 | Allen et al. | 137—101 |
| 3,334,705 | 8/1967 | Lam | 137—118 X |

OTHER REFERENCES

Burchard: German printed application No. 1,163,621, pub. 2—1964.

GEORGE F. MAUTZ, Primary Examiner